United States Patent
Cai et al.

(10) Patent No.: US 8,842,453 B2
(45) Date of Patent: Sep. 23, 2014

(54) CONVERTER SYSTEM AND CONTROL METHOD THEREOF

(75) Inventors: Li Cai, Pudong Shanghai (CN); Liang Cao, Pudong Shanghai (CN); Chang-Yong Wang, Pudong Shanghai (CN)

(73) Assignee: Delta Electronics (Shanghai) Co., Ltd. (CN)

( * ) Notice: Subject to any disclaimer, the term of this patent is extended or adjusted under 35 U.S.C. 154(b) by 236 days.

(21) Appl. No.: 13/619,573

(22) Filed: Sep. 14, 2012

(65) Prior Publication Data

US 2013/0279222 A1 Oct. 24, 2013

(30) Foreign Application Priority Data

Apr. 18, 2012 (CN) .......................... 2012 1 0114764

(51) Int. Cl.
*H02J 1/10* (2006.01)
(52) U.S. Cl.
USPC .............................................. 363/65; 363/35
(58) Field of Classification Search
USPC ................. 363/34, 35, 37, 65, 67, 69, 71, 72; 307/82
See application file for complete search history.

(56) References Cited

U.S. PATENT DOCUMENTS

| | | | |
|---|---|---|---|
| 5,886,888 A * | 3/1999 | Akamatsu et al. | 363/65 |
| 7,187,152 B1 * | 3/2007 | Tsai | 318/400.02 |
| 7,411,309 B2 * | 8/2008 | Hudson | 290/44 |
| 7,423,412 B2 * | 9/2008 | Weng et al. | 322/20 |
| 7,683,587 B2 * | 3/2010 | Inaba et al. | 322/20 |
| 7,751,211 B2 * | 7/2010 | Yuzurihara et al. | 363/127 |
| 7,907,427 B2 * | 3/2011 | Sakakibara et al. | 363/37 |
| 8,106,526 B2 * | 1/2012 | Abolhassani et al. | 290/44 |
| 2008/0007973 A1 * | 1/2008 | Schreiber | 363/2 |
| 2013/0182465 A1 * | 7/2013 | Wang et al. | 363/34 |

* cited by examiner

*Primary Examiner* — Gary L Laxton
*Assistant Examiner* — Alex Torres-Rivera
(74) *Attorney, Agent, or Firm* — Lowe Hauptman & Ham, LLP

(57) ABSTRACT

A control method of a converter system includes: sampling a current of each three-phase winding to obtain a real-time current of each converter; obtaining a mean current by averaging the real-time current of each secondary converter and the real-time current of the primary converter, and transferring the mean current to each secondary converter; obtaining the differential-mode current corresponding to each secondary converter according to the mean current and the real-time current of each secondary converter; performing a circulation current control on the mean current and the differential-mode current of each secondary converter based on a d-q coordinate system to generate a mean-current conditioning signal and a differential-mode current conditioning signal, thereby controlling each secondary converter; and obtaining a sum of the differential-mode current conditioning signal of the secondary converters and negating the sum to obtain a differential-mode current conditioning signal of the primary converter, thereby controlling the primary converter.

10 Claims, 7 Drawing Sheets

CONVERTER SYSTEM AND CONTROL METHOD THEREOF

RELATED APPLICATIONS

This application claims priority to Chinese Application Serial Number 201210114764.4, filed Apr. 18, 2012, which is herein incorporated by reference.

BACKGROUND

1. Field of Invention

The present invention relates to the field of wind power generation. More particularly, the present invention relates to a converter system for wind power generation and a control method thereof.

2. Description of Related Art

With increasingly shortage of energy, increasingly serious energy crisis and the development of power electronic technology and components, wind power generation is continuously developed. With the development of the wind power generation, one single-machine capacity of its related wind power turbine is continuously increased, and thus the capacity of the corresponding converter has to be increased. However, due to various factors, the single-machine capacity of the converter is limited and is hard to be further improved. Thus, those of skills in the art provide the solution of "multi-phase generator & multiple converters" to improve the total capacity of the converter. In particularly, each three-phase winding of the multi-phase generator is connected in series to a back-to-back converter. The back-to-back converter includes a generator-side converter and a grid-side converter. For this solution, since the number of the back-to-back converter is increased, so that the total capacity of the converter can be improved.

Currently, for the solutions mentioned above, the converter is generally controlled through the following two methods:

1) performing control by using a single generator-side controller, wherein specifically, the samples of multiple generator-side converters are all transferred to the same generator-side controller, i.e., all the converters are controlled through only one generator-side controller; and 2) individually controlling the parallel connected converters without circulation current control, wherein specifically, each three-phase winding (every three phases) of the multi-phase generator is individually controlled by a controller, but if the leakage inductance of the generator is relatively small, this control method cannot be implemented.

However, for the method 1), since only one controller is used to control multiple converters, the sampling path and the driving path of the controller is complex and is not easy to be implemented; and for the method 2), since there is no circulation current control, the controlling effect is not good, and especially when the leakage inductance of the multi-phase generator is relatively small, the control method cannot be implemented.

In view of this, many in the industry are endeavoring to find ways in which to design a converter system and a control method thereof for the multi-phase generator to control the converter system, so that the multi-phase generator can be controlled stably and current sharing can be realized among each converter.

SUMMARY

In order to solve the technical problems mentioned above, and an aspect of the present invention is to provide a control method of a converter system. The converter system is coupled between a multi-phase generator and an electric grid. The multi-phase generator has N three-phase windings, wherein N is a natural number greater than or equal to 2. The three-phase windings are separated from each other. Correspondingly, the converter system has N converters. The converters are correspondingly coupled to the three-phase windings. The $N^{th}$ converter is a primary converter, and the $i^{th}$ converter is a secondary converter, where $1 \leq i < N$. The control method includes:

a) sampling a current at an output end of each three-phase winding to obtain a real-time current of each converter;

b) enabling the primary converter to obtain the real-time current of each secondary converter, to obtain a mean current by averaging the real-time current of each secondary converter and the real-time current of the primary converter, and to transfer the mean current to each secondary converter;

c) enabling each secondary converter to obtain a differential-mode current corresponding thereto according to its mean current and real-time current;

d) enabling each secondary converter to perform a circulation current control on its mean current and differential-mode current based on a d-q coordinate system for respectively generating a mean-current conditioning signal and a differential-mode current conditioning signal, thereby controlling each secondary converter; and e) enabling the primary converter to obtain a sum of the differential-mode current conditioning signal of each secondary converter and then negate the sum to obtain the differential-mode current conditioning signal of the primary converter; and controlling the primary converter according to the differential-mode current conditioning signal of the primary converter and the mean-current conditioning signal.

In an embodiment of the present invention, step d) includes:

performing the circulation current control on the mean current based on the d-q coordinate system so as to adjust the mean current to a given current; and performing the circulation current control on the differential-mode current so as to adjust the differential-mode current to zero.

In another embodiment of the present invention, step d) includes:

comparing the mean current with the given current to get a difference, performing a first coordinate conversion on the difference to obtain a value of the difference based on the d-q coordinate system, and subsequently performing a first proportional-integral (PI) control to generate the mean-current conditioning signal;

comparing the differential-mode current of each secondary converter with zero to obtain a result; performing a first coordinate conversion on the comparison result; subsequently performing a second PI control to generate the differential-mode current conditioning signal of each secondary converter, and thereafter summing the differential-mode current conditioning signal of each secondary converter and the mean current conditioning signal to generate the conditioning signal of each secondary converter; and performing a second coordinate conversion on the conditioning signal of each secondary converter to generate a control signal of each secondary converter, wherein the second coordinate conversion is an inverse conversion of the first coordinate conversion.

In an embodiment of the present invention, step e) includes: subtracting the sum of the differential-mode current conditioning signals corresponding to from the first to the $(N-1)^{th}$ converters from the mean-current conditioning signal to generate the conditioning signal of the primary converter, thereby controlling the primary converter.

Another aspect of the present invention is to provide a converter system coupled between a multi-phase generator and an electric grid. The multi-phase generator has N three-phase windings, wherein N is a natural number greater than or equal to 2. The three-phase windings are mutually separated, and the converter system includes:

N converters each of which is correspondingly coupled to a three-phase winding, each converter including:

a generator-side converter and a generator-side controller, wherein the generator-side converter is coupled to an output end of a corresponding three-phase winding, and the generator-side controller is used to control the generator-side converter;

a bulk capacitor coupled to an output end of the generator-side converter; and a grid-side converter and a grid-side controller, wherein the grid-side converter is coupled between two ends of the bulk capacitor, and the grid-side controller is used to control the grid-side converter;

wherein among N generator-side controllers, the $N^{th}$ generator-side controller is a primary controller, and the $i^{th}$ generator-side controller is a secondary controller, where $1 \leq i < N$. The primary controller acquires and processes the real-time current of each converter which is sampled by each secondary controller, so as to obtain a mean current, and subsequently the primary controller transfers the mean current to each secondary controller. Each secondary controller obtains the differential-mode current corresponding to the secondary converter according to the mean current and the real-time current of each secondary converter. Each secondary controller performs a circulation current control on the mean current and the differential-mode current based on a d-q coordinate system to respectively generate a mean-current conditioning signal and a differential-mode current conditioning signal, so as to control each secondary converter. The primary controller obtains a sum of the differential-mode current conditioning signal of each secondary converter and negates the sum to obtain the differential-mode current conditioning signal of the primary converter, so as to control the primary converter according to the differential-mode current conditioning signal of the primary converter and the mean-current conditioning signal.

In an embodiment of the present invention, the generator-side controller includes a mean-current control ring used for adjusting the mean current to a given current.

In another embodiment of the present invention, the generator-side controller further includes a differential-mode current control ring used for adjusting the differential-mode current to zero.

In an embodiment of the present invention, for the secondary controller, the differential-mode current control ring is used to adjust the fundamental frequency component of the differential-mode current; and for the primary controller, the differential-mode current control ring includes a summator for adjusting the differential-mode current of the primary converter.

In an embodiment of the present invention, each generator-side converter and each grid-side converter is formed from an insulated gate bipolar transistor (IGBT).

In an embodiment of the present invention, the multi-phase generator is a multi-phase permanent magnet synchronous generator, a multi-phase excitation synchronous generator or a multi-phase induction generator.

In view of the above, due to the circulation control, by adopting the converter system and the control method thereof provided by the present invention, the multi-phase generator is controlled stably and current sharing is realized among each converter. Furthermore, since the generator-side converter and the grid-side converter of each converter correspond to a generator-side controller and a grid-side controller, rather than be controlled by only one controller, so that the driving path is simplified. Moreover, the high-speed communication is established among each controller so as to obtain the control-related information in real time, without additionally sampling related information of each converter, so that the driving path is simplified.

DETAILED DESCRIPTION

The present invention will be described in details in the following embodiments with reference to the accompanying drawings. However, the embodiments described are not intended to limit the present invention. Moreover, it is not intended for the description of operation to limit the order of implementation. Any device with equivalent functions that is produced from a structure formed by a recombination of elements shall fall within the scope of the present invention. Moreover, the appending drawings are only used for illustration and are not drawn to scale.

The term "couple" mentioned in the preset disclosure indicates that two elements are connected directly with each other or that two elements are connected indirectly, such as through a third element.

Figure 1:
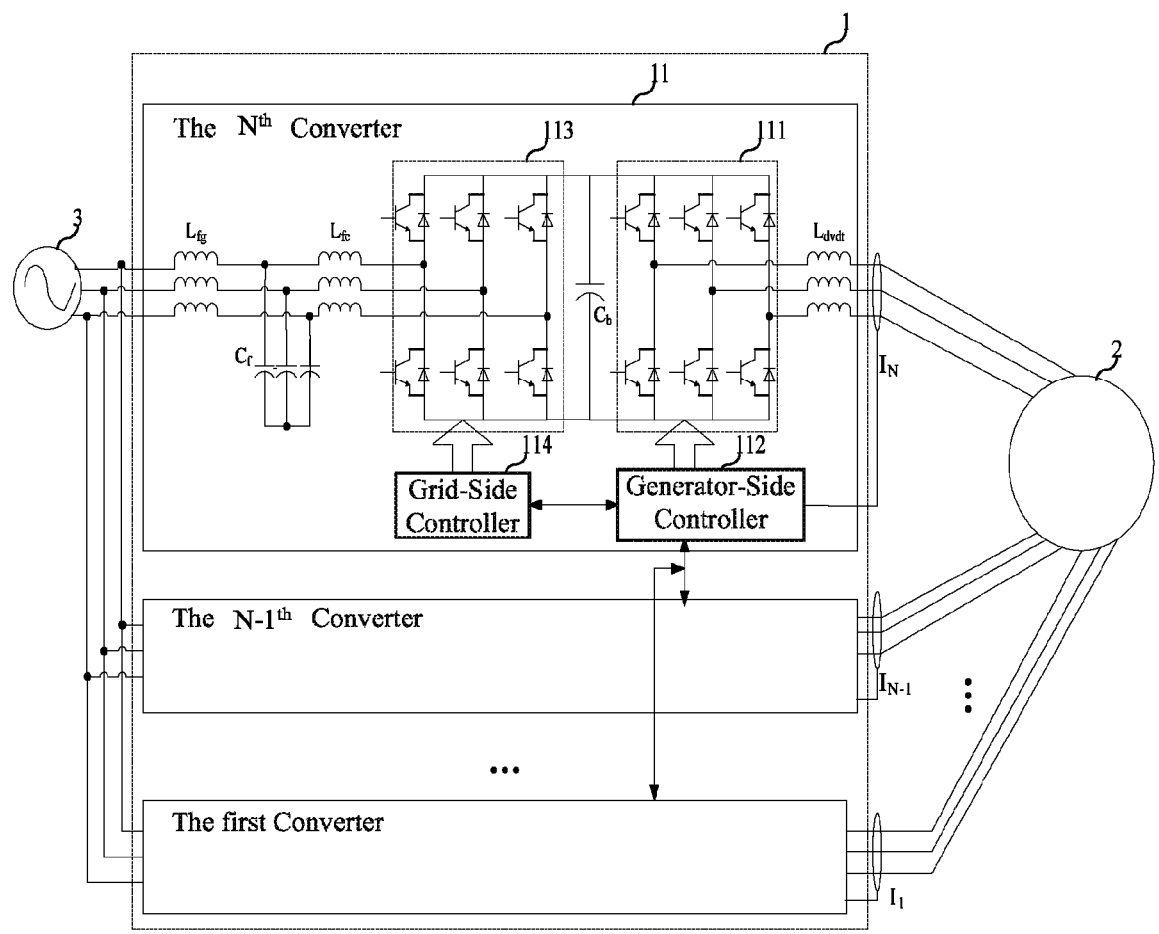
FIG. 1 illustrates a circuit topology structure of a converter system according to an embodiment of the present invention.

FIG. 1 illustrates a circuit topology structure of a converter system according to an embodiment of the present invention.

As shown in FIG. 1, the converter system 1 is coupled between a multi-phase generator 2 and an electric grid 3. In this embodiment, the multi-phase generator 2 has N three-phase windings, where N is a natural number greater than or equal to 2, and thus the multi-phase generator 2 is a 3N-phase generator. Moreover, the three-phase windings are mutually separated, so as to prevent circulating currents among the three-phase windings from being generated.

As shown in FIG. 1, the converter system 1 includes N converters 11. The converters 11 are correspondingly coupled to the three-phase windings, and each converter 11 includes a generator-side converter 111, a generator-side controller 112, a grid-side converter 113, a grid-side controller 114 and a bulk capacitor $C_b$. In an embodiment, the $N^{th}$ converter is the primary converter, and the $i^{th}$ converter is the secondary converter, where $1 \leq i < N$.

The generator-side converter 111 is coupled to the output end of the corresponding three-phase winding, so as to convert the AC power outputted by the three-phase winding of the multi-phase generator 2 into the DC power. The generator-side controller 112 is used to control the generator-side converter 111. The bulk capacitor $C_b$ is coupled to the output end of the generator-side converter 111, i.e., coupled to two ends of the DC bus of the generator-side converter 111. The grid-side converter 113 is coupled to two ends of the bulk capacitor $C_b$, so as to convert the DC voltage at the two ends of the bulk capacitor $C_b$ into an AC voltage and transfer the AC voltage to the electric grid 3. It can be seen from the figure that a back-to-back converter is formed from the grid-side converter 113 and the generator-side converter 111. The grid-side controller 114 is used to control the grid-side converter 113. FIG. 1 has already illustrated the first converter 11 in details, and since other converters 11 have the same structure as the first converter 11, for purpose of simplicity, other converters 11 are not illustrated herein again.

The generator-side controller 112 may be divided into a primary generator-side controller and a secondary generator-side controller. the $N^{th}$ generator-side controller is referred to as the primary generator-side controller, and other $N-1^{th}$ generator-side controllers are referred to as the secondary controllers. Each generator-side controller receives the real-time current $I_i$ from the output end of the corresponding three-phase winding. Particularly, each generator-side controller receives the real-time current $I_i$, such as $I_1$, $I_2$ and $I_n$ from the output end of each three-phase winding via a sampling path. It should be noted that $I_i$ refers to a three-phase current. For example, the real-time current $I_1$ of the first three-phase winding actually includes $I_{a1}$, $I_{b1}$ and $I_{c1}$, and for the purpose of simplicity, $I_1$ is used to represent $I_{a1}$, $I_{b1}$ and $I_{c1}$. In order to receive control-related information in real time, high-speed communication can be established between the generator-side primary controller and the generator-side secondary controller with reference to the frequency of switches or other operation conditions. Moreover, the generator-side secondary controller can transfer the real-time current to the generator-side primary controller via the high-speed communication, so that the generator-side primary controller processes the real-time current Ii to obtain a mean current $I_{norm}$. For example, the mean current $I_{norm}$ of N three-phase windings can be calculated from equation (1) below:

$$I_{norm}=(I_1+I_2+\ldots+I_{N-1}+I_N)/N \quad (1)$$

Furthermore, the generator-side primary controller can transfer the mean current to the generator-side secondary controller via the high-speed communication. The generator-side secondary controller receives a differential-mode current $I_{dm\_i}$ corresponding to the $i^{th}$ converter based on the mean current $I_{norm}$ and the real-time current $I_i$ outputted by the $i^{th}$ three-phase winding, wherein the $i^{th}$ converter is corresponding to the $i^{th}$ three-phase winding, where $1 \le i < N$, and the differential-mode current $I_{dm\_i}$ can be calculated from equation (2) below:

$$I_{dm\_i}=I_i-I_{norm}, \quad (2)$$

For example, the differential-mode current $I_{dm\_1}$ of the first converter can be calculated as $I_{dm\_1}=I_1-I_{norm}$.

In this embodiment, the $i^{th}$ generator-side controller and the $i^{th}$ grid-side controller perform circulation current control on the mean current $I_{norm}$ and the differential-mode current $I_{dm\_i}$ based on the d-q coordinate system, so as to respectively control the generator-side converter and the grid-side converter of the $i^{th}$ converter, which is described in details as follows.

It can be seen from FIG. 1 that the converter 11 further includes a three-phase inductance $L_{dvdt}$ coupled to the multi-phase generator 2, three-phase inductances $L_{fg}$ and $L_{fc}$ coupled to the electric grid 3 and a three-phase capacitor $C_f$. The high-speed communication can be established among the generator-side converters 112, and between the generator-side controller 112 and the grid-side controller 114 of each converter 11, so as to transfer related data in real time, for example, to transfer the mean current $I_{norm}$ and the differential-mode current $I_{dm}$. Furthermore, each generator-side converter 111 or each grid-side converter 113 can be formed from an insulated gate bipolar transistor (IGBT). Moreover, the multi-phase generator 2 may be, but not limited to a multi-phase permanent magnet synchronous generator, a multi-phase excitation synchronous generator or a multi-phase induction generator.

Figure 2:
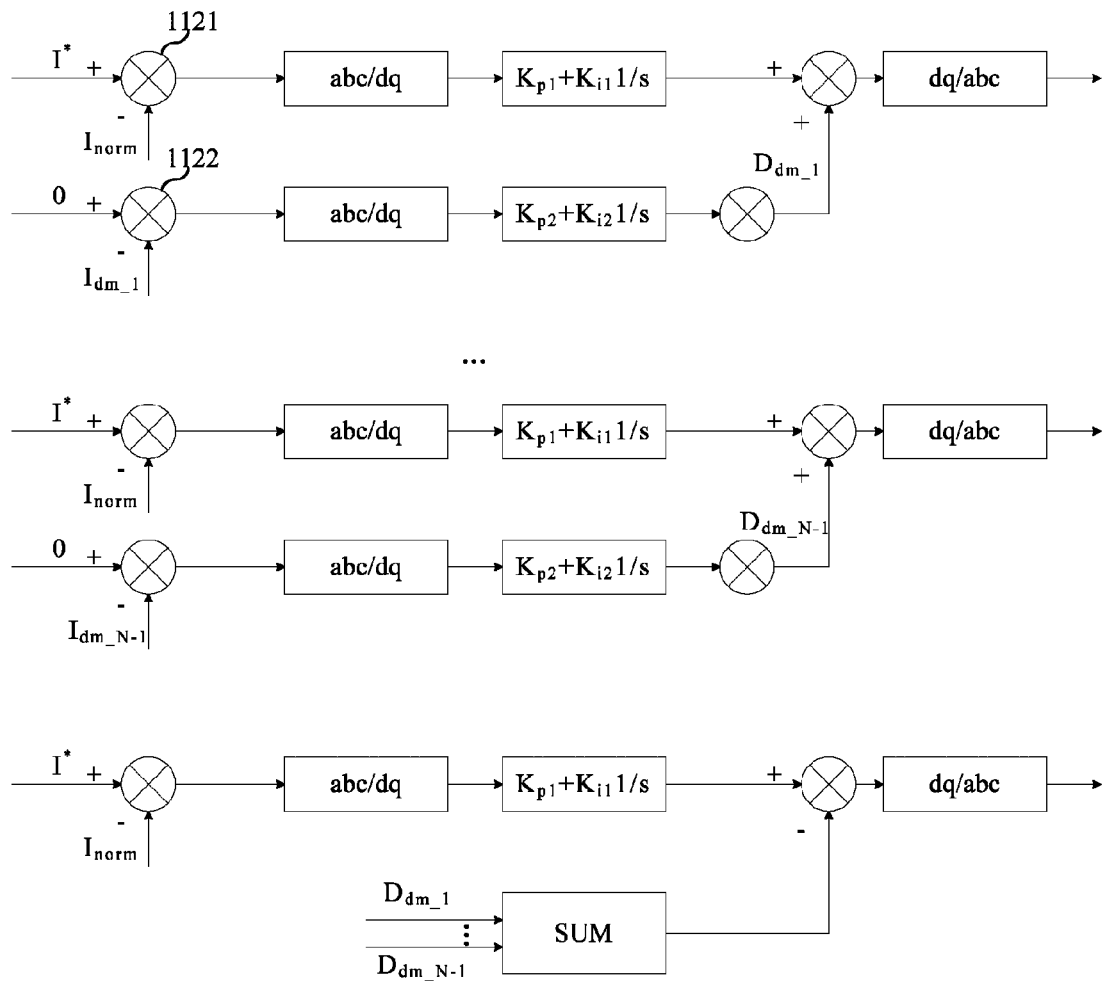
FIG. 2 illustrates a control block diagram of each generator-side converter of the converter system shown in FIG. 1.

Referring both FIGS. 1 and 2, FIG. 2 illustrates a control block diagram of each generator-side converter of the converter system shown in FIG. 1.

As shown in FIGS. 1 and 2, the first generator-side controller 112 is used to control a corresponding generator-side converter 111.

The first generator-side controller 112 includes a mean-current control ring 1121 and a differential-mode current control ring 1122.

The mean-current control ring 1121 is used to adjust the mean current $I_{norm}$ to a given current I*, and this given current I* can be determined according to requirements. It can be seen from the figures that in the control ring, the mean current $I_{norm}$ and the given current I* are first compared and a first coordinate conversion, i.e., an abc/dq coordinate conversion, is performed according to the difference between the mean current $I_{norm}$ and the given current I*, so as to obtain a value of the difference based on the d-q coordinate system via the coordinate conversion. Subsequently, a first proportional-integral (PI) control is performed using a first PI controller, so as to generate a mean-current control signal, wherein the coefficients $K_{p1}$ and $K_{i1}$ of the PI controller is associated with the mutual inductance and the leakage inductance of the multi-phase generator 2.

The differential-mode current control ring 1122 is used to adjust the differential-mode current $I_{dm\_1}$ to zero. The differential-mode current control ring 1122 compares the differential-mode current $I_{dm\_1}$ of the first converter with zero, and performs a first coordinate conversion onto the comparison result. Subsequently, a second PI control is performed using a second PI controller, so as to generate a differential-mode current control signal, wherein the coefficients $K_{p2}$ and $K_{i2}$ of the second PI controller is associated with the leakage inductance of the multi-phase generator 2, and the duty ratio of the differential-mode current conditioning signal is $D_{dm\_1}$.

Subsequently, a conditioning signal of the first generator-side converter 111 is generated by summing the differential-mode current conditioning signal generated in the differential-mode current control ring 1122 and the mean current conditioning signal generated in the mean-current control ring 1121. The conditioning signal of the first generator-side converter 111 is based on the d-q coordinate, so that a second coordinate conversion (dq/abc), i.e. an inverse conversion, to the first coordinate conversion should be further performed, so as to generate the control signal of the generator-side converter 111 via the inverse conversion.

It can be seen from FIG. 2 that each of other generator-side controllers has the same structure as the first generator-side controller 112, and only the differential-mode current control ring of the $N^{th}$ generator-side controller has a different structure. The differential-mode current control ring sums the differential-mode current control signals corresponding to from the first to the $N-1^{th}$ converters via a summator, i.e., sums the differential-mode current control signals having a duty ratio of $D_{dm\_1}$, $D_{dm\_2}$ ... $D_{dm\_N-1}$, so as to compare (difference) the sum with the mean-current conditioning signal to generate the conditioning signal of the $N^{th}$ converter. Since each of other generator-side controllers has the same structure as the first generator-side controller 112, for the purpose of simplicity, it will not be illustrated herein again. Since the mean-current control ring of each generator-side controller is the same, and the conditioning target value of each mean-current control ring is I*, current sharing can be realized among the generator-side converters. Furthermore, the output of the multi-phase generator 2 can be stabilized via the control process shown in FIG. 2. That is, the multi-phase generator 2 is controlled relative stably.

It should also be noted that, only the control of the generator-side converter 111 is illustrated herein, and the control of the grid-side converter 113 can be performed by the grid-side controller 114 correspondingly controlling the grid-side converter 113 according to the real-time information which is collected in the high-speed communication channel and is associated with the control of the generator-side converter 111 by the generator-side controller 114.

In order to understand the above embodiments more clearly, the following description illustrates the principle and the process of the circulation current control mentioned above according to a specific embodiment.

Figure 3:
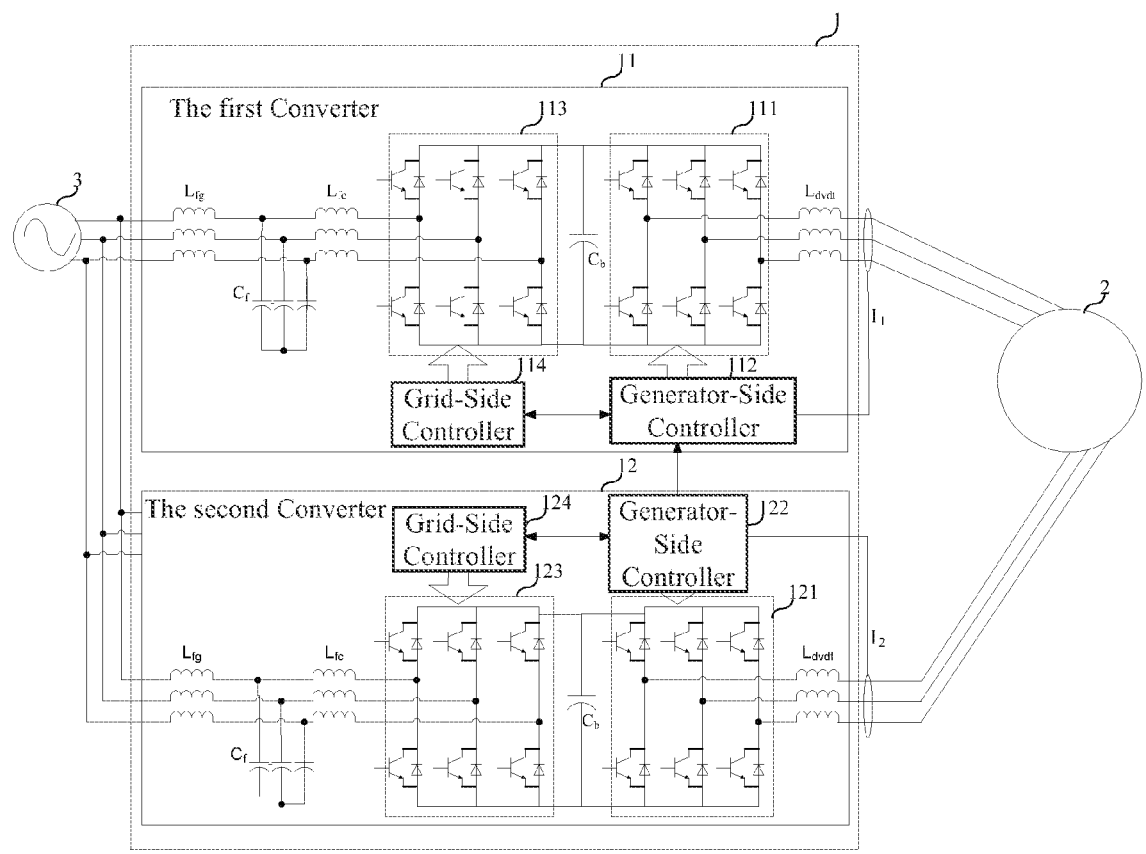
FIG. 3 illustrates a circuit topology structure of an embodiment of the converter system shown in FIG. 1.
Figure 4A:
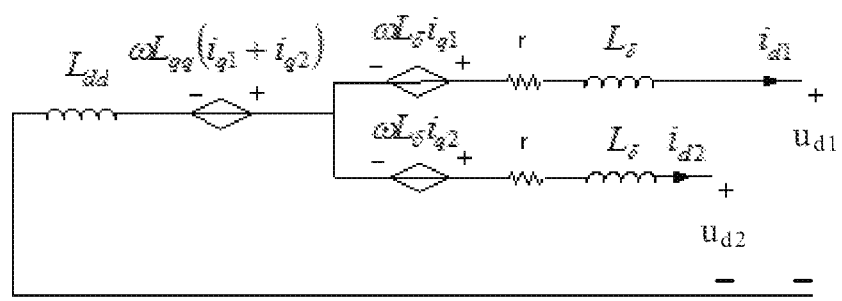
FIGS. 4A and 4B respectively illustrate equivalent circuit diagrams of a multi-phase generator of FIG. 3.
Figure 4B:
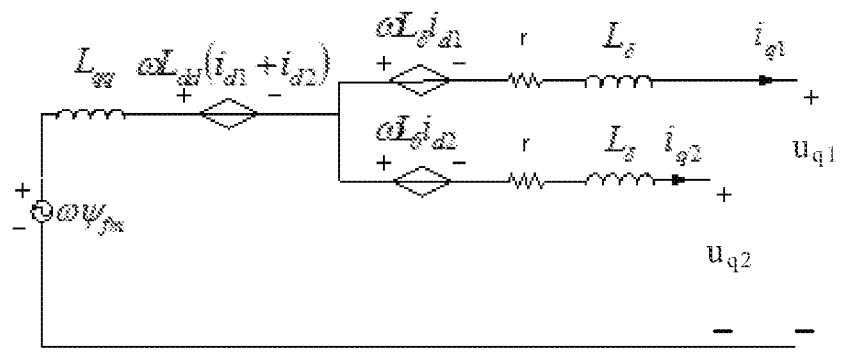
Figure 5A:
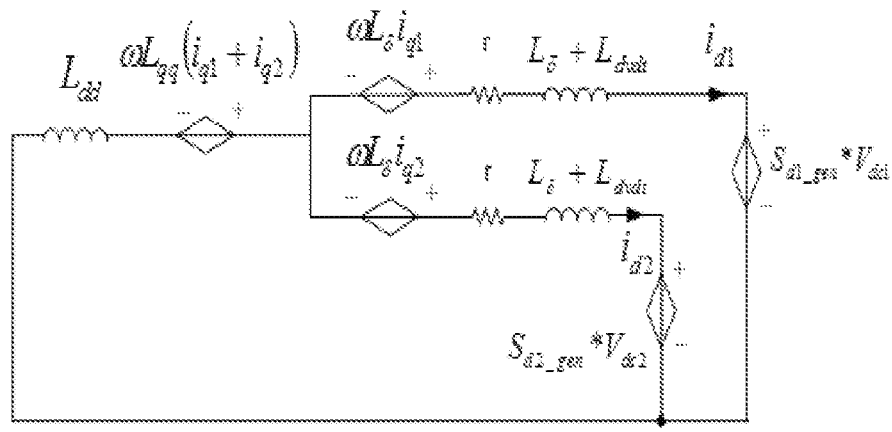
FIGS. 5A and 5B respectively illustrate equivalent circuit diagrams of a multi-phase generator, a first generator-side converter and a second generator-side converter.
Figure 5B:
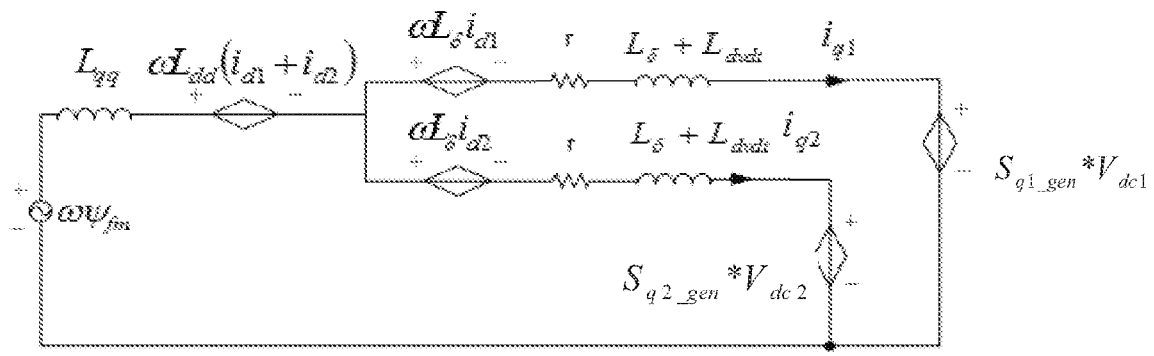
Figure 6:
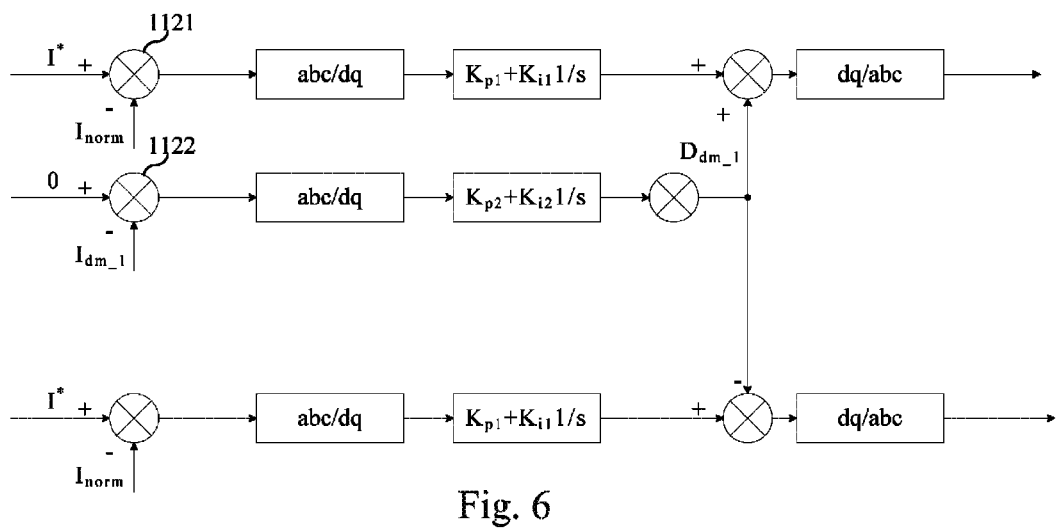
FIG. 6 illustrates a control block diagram of a first generator-side converter and a second generator-side converter.

Referring FIGS. 3, 4A-4B, 5A-5B and 6, FIG. 3 illustrates a circuit topology structure of an embodiment of the converter system shown in FIG. 1. FIGS. 4A and 4B respectively illustrate equivalent circuit diagrams of the multi-phase generator shown in FIG. 3. FIGS. 5A and 5B respectively illustrate equivalent circuit diagrams of the multi-phase generator, the first generator-side converter and the second generator-side converter shown in FIG. 3. FIG. 6 illustrates a control block diagram of the first generator-side converter and the second generator-side converter.

As shown in FIG. 3, the multi-phase generator 3 is a six-phase generator having two three-phase windings, i.e. N=2. Correspondingly, the converter system 1 has two converters, i.e., the first converter 11 and the second converter 12. Hereinafter, the second converter is marked as 12 so as to separately illustrate the second converter and the first converter.

As shown in FIG. 3, the first converter 11 includes a generator-side converter 111, a generator-side controller 112, a grid-side converter 113, a grid-side controller 114 and a bulk capacitor $C_b$. Similarly, the second converter 12 includes a generator-side converter 121, a generator-side controller 122, a grid-side converter 123, a grid-side controller 124 and a bulk capacitor $C_b$.

Due to the advantages of the d-q coordinate system during stable control, in this embodiment, the control parameters are set based on the d-q coordinate system. For example FIGS. 4A, 4B, 5A and 5B are equivalent diagrams of the d axis and the q axis. The equations obtained from FIGS. 4A and 4B are expressed as below:

$$u_{d1} = -ri_{d1} - L_\delta \frac{di_{d1}}{dt} + \omega L_\delta i_{q1} - L_{dd}\left(\frac{di_{d1}}{dt} + \frac{di_{d1}}{dt}\right) + \omega L_{qq}(i_{q1}+i_{q2}) \quad (3)$$

$$u_{d2} = -ri_{d2} - L_\delta \frac{di_{d2}}{dt} + \omega L_\delta i_{q2} - L_{dd}\left(\frac{di_{d2}}{dt} + \frac{di_{d2}}{dt}\right) + \omega L_{qq}(i_{q1}+i_{q2}) \quad (4)$$

$$u_{q1} = -ri_{q1} - L_\delta \frac{di_{q1}}{dt} + \omega L_\delta i_{d1} - L_{qq}\left(\frac{di_{q1}}{dt} + \frac{di_{q2}}{dt}\right) - \omega L_{dd}(i_{d1}+i_{d2}) + \omega \psi_{fm} \quad (5)$$

$$u_{q2} = -ri_{q2} - L_\delta \frac{di_{q2}}{dt} + \omega L_\delta i_{d2} - L_{qq}\left(\frac{di_{q1}}{dt} + \frac{di_{q2}}{dt}\right) - \omega L_{dd}(i_{d1}+i_{d2}) + \omega \psi_{fm} \quad (6)$$

wherein, $u_{d1}$ and $u_{d2}$ are respectively the output voltages of the first and the second three-phase windings of the multi-phase generator 2 on the d axis; $i_{d1}$ and $i_{d2}$ are respectively the output current of the first and the second three-phase windings of the multi-phase generator 2 on the d axis; $u_{q1}$ and $u_{q2}$ are respectively the output voltages of the first and the second three-phase windings of the multi-phase generator 2 on the q axis; $i_{q1}$ and $i_{q2}$ are respectively the output currents of the first and the second three-phase windings of the multi-phase generator 2 on the q axis; $L_{dd}$ and $L_{qq}$ are respectively the mutual inductances of the multi-phase generator on the d axis and the q axis; and r, $L_\delta$ and $\omega$ are the stator resistance, the leakage inductance and the electric angular velocity of the generator 2.

Similarly, the equations obtained from FIGS. 5A and 5B are expressed as below:

$$S_{d1\_gen} * V_{dc1} = -ri_{d1} - (L_\delta + L_{dvdt})\frac{di_{d1}}{dt} + \omega L_\delta i_{q1} - L_{dd}\left(\frac{di_{d1}}{dt} + \frac{di_{d2}}{dt}\right) + \omega L_{qq}(i_{q1}+i_{q2}) \quad (7)$$

$$S_{d2\_gen} * V_{dc2} = -ri_{d2} - (L_\delta + L_{dvdt})\frac{di_{d2}}{dt} + \omega L_\delta i_{q2} - L_{dd}\left(\frac{di_{d1}}{dt} + \frac{di_{d2}}{dt}\right) + \omega L_{qq}(i_{q1}+i_{q2}) \quad (8)$$

$$S_{q1\_gen} * V_{dc1} = -ri_{q1} - (L_\delta + L_{dvdt})\frac{di_{q1}}{dt} + \omega L_\delta i_{d1} - L_{qq}\left(\frac{di_{q1}}{dt} + \frac{di_{q2}}{dt}\right) - \omega L_{dd}(i_{d1}+i_{d2}) + \omega \psi_{fm} \quad (9)$$

$$S_{q2\_gen} * V_{dc2} = -ri_{q2} - (L_\delta + L_{dvdt})\frac{di_{q2}}{dt} + \omega L_\delta i_{d2} - L_{qq}\left(\frac{di_{q1}}{dt} + \frac{di_{q2}}{dt}\right) - \omega L_{dd}(i_{d1}+i_{d2}) + \omega \psi_{fm} \quad (10)$$

wherein $V_{dc1}$ is the bus voltage between the generator-side converter 111 and the grid-side converter 113 of the first converter 11; $V_{dc2}$ is the bus voltage between the generator-side converter 121 and the grid-side converter 1123 of the second converter 12; $S_{d1\_gen}$ and $S_{q1\_gen}$ are respectively the duty ratios of the generator-side converter 111 on the d axis and the q axis; and $S_{d2\_gen}$ and $S_{q2\_gen}$ are respectively the duty ratios of the generator-side converter 121 on the d axis and the q axis. It can be seen from the equations (7)-(10) that, the current of the first generator-side converter 111 can be adjusted by adjusting the duty ratios $S_{d1\_gen}$ and $S_{q1\_gen}$, so as to control the first generator-side converter 111. The adjustment of the duty ratios $S_{d1\_gen}$ and $S_{q1\_gen}$, i.e., the adjustment of the duty ratios of the control signal of the first generator-side converter 111, is specifically illustrated in FIG. 6. Similarly, the control of the second generator-side converter 121 can be performed by adjusting $S_{d2\_gen}$ and $S_{q2\_gen}$, and the specific adjusting process is illustrated in FIG. 6.

As shown in FIG. 6, the mean-current control ring 1121 is used to adjust the mean current $I_{norm}$ to a given current I*, and the specific adjusting process can refer to the description related to FIG. 2. The related control parameters $K_{p1}$ and $K_{i1}$ can be determined according to the mutual inductance $L_{dd}$ and $L_{qq}$, and the leakage inductance $L_\delta$ of the multi-phase generator 2. The differential-mode current control ring 1122 is used to adjust the differential-mode current $I_{dm\_1}$ to zero, and the specific adjustment process can refer to the description related to FIG. 2. The parameters $K_{p2}$ and $K_{i2}$ can be determined according to the mutual inductance of the multi-phase generator 2. Through the control by using the mean-current control ring 1121 and the differential-mode current control ring 1122, the output of the multi-phase generator 2 is relatively stable.

It should be noted that in other embodiments, the differential-mode current inputted by the differential-mode current control ring 1122, i.e., the differential-mode current inputted into the second converter 12 is set as $I_{dm\_2}$, so that a differential-mode current conditioning signal having the duty ratio $D_{dm\_2}$ is correspondingly generated. A conditioning signal of the second generator-side converter 121 is obtained by summing the differential-mode current conditioning signal and the mean-current conditioning signal generated by the mean-current control ring 1121, and a conditioning signal of the first generator-side converter 111 is obtained by comparing (differencing) the differential-mode current conditioning signal and the mean-current conditioning signal outputted by the mean-current control ring 1121.

Figure 7:
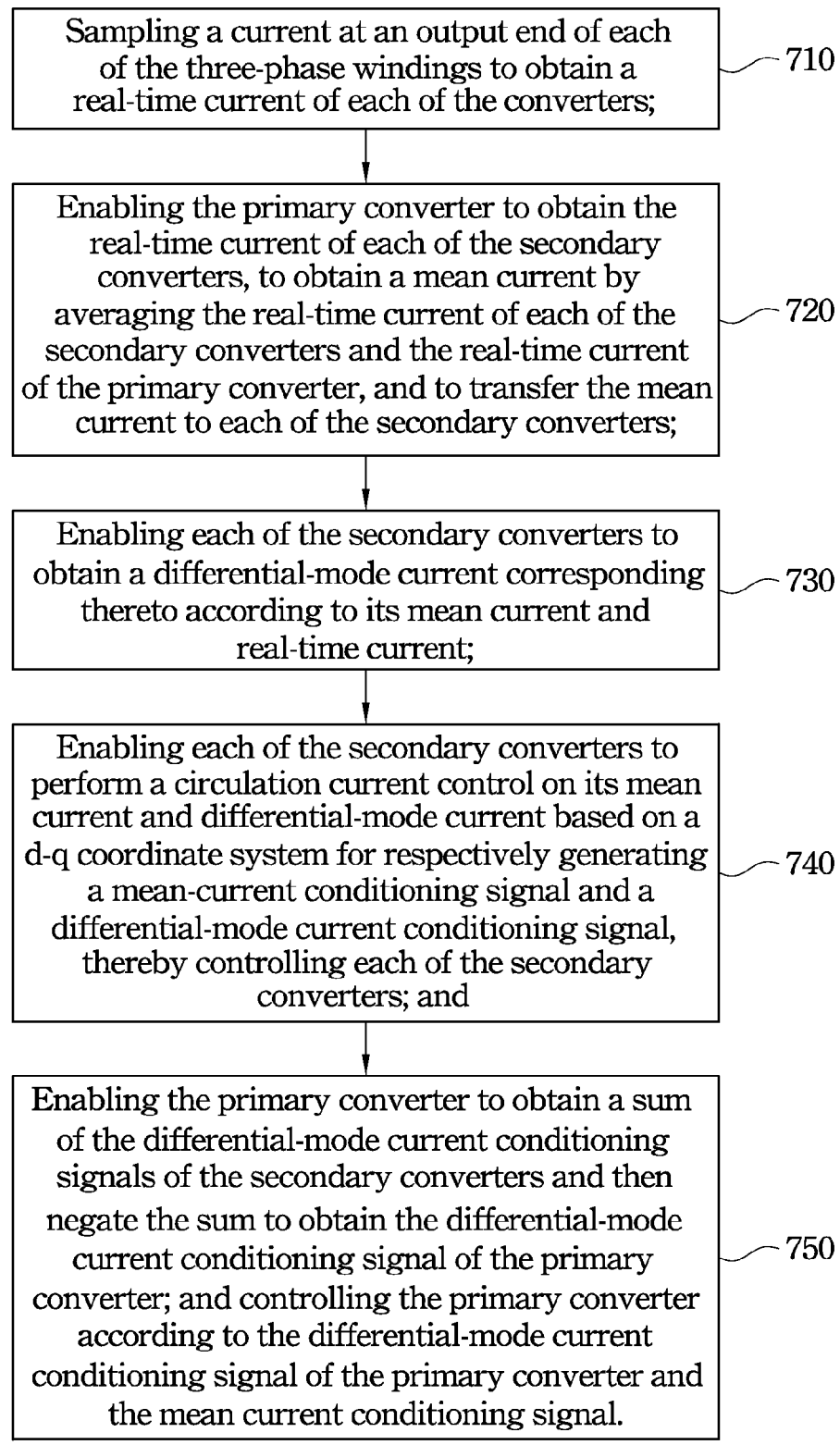
FIG. 7 illustrates a control method of a converter system according to another embodiment of the present invention.

FIG. 7 illustrates a control method of a converter system according to another embodiment of the present invention.

In the following text, FIG. 7 illustrates a control method of the converter system 1 in connection with FIG. 1.

First, in step 710, the current at the output end of each three-phase winding is sampled to obtain the real-time current of each converter. For example, when the multi-phase generator 2 has N three-phase windings, correspondingly the converter system 1 has N converters, so as to obtain the real-time current of N converters by sampling.

Subsequently, in step 720, the primary converter is enabled to obtain the real-time current of each secondary converter and thus to obtain a mean current $I_{norm}$ by averaging the real-time current of the secondary converter and the sampled real-time current of the primary converter itself, so as to transfer the mean current $I_{norm}$ to each secondary converter. In an embodiment, the primary converter is the $N^{th}$ converter, and the other (N–1) converters are the secondary converters.

Afterwards, in step 730, each secondary converter is enabled to obtain a corresponding differential-mode current $I_{dm}$ according to its mean current $I_{norm}$ and real-time current $I_i$, where $1 \leq i < N$.

Subsequently, in step 740, each secondary converter is enabled to perform a circulation current control on the mean current $I_{norm}$ and the differential-mode current $I_{dm}$ based on the d-q coordinate system so as to respectively generate a mean-current conditioning signal and a differential-mode current conditioning signal, thereby controlling each secondary converter. Particularly, the circulation current control is performed on the mean current $I_{norm}$ based on the d-q coordinate system so as to adjust the mean current $I_{norm}$ to a given current $I^*$, and specifically, the mean current $I_{norm}$ is compared with the given current $I^*$ to get a difference, and then a first coordinate conversion (abc/dq) is performed to get a value of the difference based on the d-q coordinate system, and afterwards, a mean-current conditioning signal is generated by performing a first proportional-integral (PI) control; the circulation current control is performed on the differential-mode current $I_{dm}$ based on the d-q coordinate system so as to adjust the differential-mode current $I_{dm}$ to zero, and specifically the differential-mode current of each secondary converter is compared with zero to get a result, and then a first coordinate conversion is performed on the comparison result, and afterwards a differential-mode current conditioning signal of each secondary converter is generated by performing a second PI control, and finally a conditioning signal of each secondary converter is generated by summing the differential-mode current conditioning signal and the mean-current conditioning signal of each secondary converter; and a second coordinate conversion is performed on the conditioning signal of each secondary converter so as to generate a control signal of each secondary converter, wherein the second coordinate conversion is an inverse conversion of the first coordinate conversion.

Subsequently in step 750, the primary converter is enabled to obtain a sum of the differential-mode current conditioning signal of each secondary converter and negates the sum to get the differential-mode current conditioning signal of the primary converter, and the primary converter is controlled according to the differential-mode current conditioning signal and the mean-current conditioning signal of the primary converter. In particular, the control signal of the primary converter is generated by subtracting the sum of the differential-mode current conditioning signals corresponding to the first to N–$1^{th}$ converters from the mean-current conditioning signal to generate the conditioning signal of the primary converter, so as to control the primary converter.

In view of the above, due to the circulation current control, by adopting the converter system and the control method thereof provided by the present invention, the multi-phase generator can be controlled stably and current sharing can be realized among each converter. Furthermore, since the generator-side converter and the grid-side converter of each converter are corresponding to a generator-side controller and a grid-side controller, instead of being controlled by only one controller, the driving path is simplified. Moreover, the high-speed communication is established among the controllers so as to obtain the control-related information in real time without additionally sampling related information of each converter, so that the driving path can be simplified.

In the foregoing, the specific embodiments of the present invention are described with reference to the accompanying drawings. However, those of ordinary skills in the art should understand that various modifications and variations can also be made to the specific embodiments of the present invention without departing from the spirit and scope of the present invention. These modifications and variations all fall in the scope defined by the claims of the present invention.

What is claimed is:

1. A control method of a converter system, wherein the converter system is coupled between a multi-phase generator and an electric grid, and the multi-phase generator has N three-phase windings, wherein N is a natural number greater than or equal to 2, and the three-phase windings are mutually separated, and correspondingly the converter system has N converters, wherein the converters are correspondingly coupled to the three-phase windings, and the $N^{th}$ converter is a primary converter, the $i^{th}$ converter is a secondary converter, where $1 \leq i < N$, the control method comprising:
   a) sampling a current at an output end of each of the three-phase windings to obtain a real-time current of each of the converters;
   b) enabling the primary converter to obtain the real-time current of each of the secondary converters, to obtain a mean current by averaging the real-time current of each of the secondary converters and the real-time current of the primary converter, and to transfer the mean current to each of the secondary converters;

c) enabling each of the secondary converters to obtain a differential-mode current corresponding thereto according to its mean current and real-time current;

d) enabling each of the secondary converters to perform a circulation current control on its mean current and differential-mode current based on a d-q coordinate system for respectively generating a mean-current conditioning signal and a differential-mode current conditioning signal, thereby controlling each of the secondary converters; and e) enabling the primary converter to obtain a sum of the differential-mode current conditioning signals of the secondary converters and then negate the sum to obtain the differential-mode current conditioning signal of the primary converter; and controlling the primary converter according to the differential-mode current conditioning signal of the primary converter and the mean-current conditioning signal.

2. The control method of claim 1, wherein the step d) comprises:
performing the circulation current control on the mean current based on the d-q coordinate system so as to adjust the mean current to a given current; and
performing the circulation current control on the differential-mode current so as to adjust the differential-mode current to zero.

3. The control method of claim 2, wherein the step d) comprises:
comparing the mean current with the given current to get a difference; performing a first coordinate conversion on the difference to obtain a value of the difference based on the d-q coordinate system; and subsequently performing a first proportional-integral (PI) control to generate the mean-current conditioning signal;
comparing the differential-mode current of each of the secondary converters with zero to obtain a result; performing a first coordinate conversion on the comparison result; subsequently performing a second PI control to generate the differential-mode current conditioning signal of each of the secondary converters; and thereafter summing the differential-mode current conditioning signal of each of the secondary converters and the mean current conditioning signal to generate the conditioning signal of each of the secondary converters; and
performing a second coordinate conversion on the conditioning signal of each of secondary converter to generate a control signal of each of the secondary converters, wherein the second coordinate conversion is an inverse conversion of the first coordinate conversion.

4. The control method of claim 1, wherein the step e) comprises:
subtracting the sum of the differential-mode current conditioning signals corresponding to from the first to the $(N-1)^{th}$ converters from the mean-current conditioning signal to generate a conditioning signal of the primary converter, thereby controlling the primary converter.

5. A converter system coupled between a multi-phase generator and an electric grid, wherein the multi-phase generator has N three-phase windings, wherein N is a natural number larger than or equal to 2, and the three-phase windings are mutually separated, the converter system comprising:
N converters each of which is correspondingly coupled to a three-phase winding, each of the converters comprising:
a generator-side converter and a generator-side controller, wherein the generator-side converter is coupled to an output end of the corresponding three-phase winding, and the generator-side controller is used to control the generator-side converter;
a bulk capacitor coupled to an output end of the generator-side converter; and
a grid-side converter and a grid-side controller, wherein the grid-side converter is coupled between two ends of the bulk capacitor, and the grid-side controller is used to control the grid-side converter;
wherein among N generator-side controllers, the $N^{th}$ generator-side controller is a primary controller, and the $i^{th}$ generator-side controller is a secondary controller, where $1 \le i < N$, and the primary controller acquires and processes a real-time current of each of the converters which is sampled by each of the secondary controllers so as to obtain a mean current, and subsequently the primary controller transfers the mean current to each of the secondary controllers, and each of the secondary controllers obtains a differential-mode current corresponding to the secondary converter according to the mean current and the real-time current of the secondary converter, and each of the secondary controllers performs a circulation current control on the mean current and the differential-mode current based on a d-q coordinate system to respectively generate a mean-current conditioning signal and a differential-mode current conditioning signal, so as to control each of the secondary converters, and the primary controller obtains a sum of the differential-mode current conditioning signal of each of the secondary converters and negates the sum to obtain the differential-mode current conditioning signal of the primary converter, so as to control the primary converter according to the differential-mode current conditioning signal of the primary converter and the mean-current conditioning signal.

6. The converter system of claim 5, wherein the generator-side controller comprises:
a mean-current control ring for adjusting the mean current to a given current.

7. The converter system of claim 6, wherein the generator-side controller further comprises:
a differential-mode current control ring for adjusting the differential-mode current to zero.

8. The converter system of claim 7, wherein:
for the secondary controller, the differential-mode current control ring is used to adjust a fundamental frequency component of the differential-mode current; and
for the primary controller, the differential-mode current control ring comprises a summator for adjusting the differential-mode current of the primary converter.

9. The converter system of claim 5, wherein each of the generator-side converters and each of the grid-side converters are formed from an insulated gate bipolar transistor.

10. The converter system of claim 5, wherein the multi-phase generator is a multi-phase permanent magnet synchronous generator, a multi-phase excitation synchronous generator or a multi-phase induction generator.

* * * * *